United States Patent

Aleckner, Jr.

[15] 3,637,428

[45] Jan. 25, 1972

[54] ADHESION OF COATINGS TO ETHYLENE-POLAR MONOMER COPOLYMER

[72] Inventor: John F. Aleckner, Jr., Bloomfield, N.J.

[73] Assignee: Union Carbide Corporation, New York, N.Y.

[22] Filed: Dec. 10, 1968

[21] Appl. No.: 782,719

[52] U.S. Cl. ..........................117/138.8 E, 117/72, 117/76 F, 117/138.8 UA, 117/161 UC, 117/161 UB

[51] Int. Cl. ....................................B32b 27/08, B32b 27/32

[58] Field of Search .................117/138.8 E, 138.8 UA, 76 F, 117/76 A, 72, , 161 UC, 161 UB

[56] References Cited

UNITED STATES PATENTS

| | | | |
|---|---|---|---|
| 2,956,902 | 10/1960 | Greif | 117/161 UC X |
| 3,088,844 | 5/1963 | Hungerford | 117/138.8 E X |
| 3,205,077 | 9/1965 | Hammond | 117/138.8 E X |
| 3,232,789 | 2/1966 | Pelzek et al. | 117/138.8 E |
| 3,340,091 | 9/1967 | Zweig | 117/138.8 E |
| 3,427,184 | 2/1969 | Mauro et al. | 117/138.8 E X |
| 3,442,687 | 5/1969 | Hagan | 117/138.8 E X |

*Primary Examiner*—William D. Martin
*Assistant Examiner*—Ralph Husack
*Attorney*—Paul A. Rose, Aldo J. Cozzi and James J. O'Connell

[57] ABSTRACT

The adhesion of coatings to ethylene-polar monomer copolymer substrates is enhanced by the use, as an adhesion promoter, of vinyl acetate polymer.

7 Claims, No Drawings

ADHESION OF COATINGS TO ETHYLENE-POLAR MONOMER COPOLYMER

BACKGROUND OF THE INVENTION

1. Field of the Invention

The invention relates to the coating of ethylene-polar monomer copolymer substrates.

2. Description of the Prior Art

Ethylene-polar monomer copolymers, such as ethylene-vinyl acetate copolymers, have been used for a number of applications which require the use of such copolymers in the form of a molded or shaped object. The use of such copolymers for various applications, however, has been curtailed due to the fact that the copolymers are clear materials which, generally, have poor paintability properties. For many applications, plastic substrates must be painted for decorative or other purposes. Those in the art, however, have not been able to provide, prior to the present invention, a procedure whereby ethylene-polar monomer copolymers, in general, may be readily painted with a well-bonded paint. Where any substantial adhesion of a paint to such substrates was obtained a costly or time-consuming pretreatment of the surface of the substrate was usually required, such as by treating the substrate by one or another procedure for oxidizing such surfaces such as by a treatment with flame, corona discharge or chromic acid. In many cases, moreover, the attempts to provide coatings for many ethylene-polar monomer copolymer substrates only led to the production of coatings which would crack and peel from the surface of the substrate when the substrate was flexed under actual or simulated use conditions.

SUMMARY OF THE INVENTION

The adhesion of coatings to ethylene-polar monomer copolymer substrates is enhanced by the use, as an adhesion promoter, of vinyl acetate polymer.

An object of the present invention is to provide a means for improving the adhesion of coatings to ethylene-polar monomer copolymer substrates.

DESCRIPTION OF THE PREFERRED EMBODIMENTS

It has been found that the adhesion of various paints or other coatings to ethylene-polar monomer copolymer substrates may be greatly enhanced by the utilization, as an adhesion promoter, of vinyl acetate polymer.

THE SUBSTRATE

The substrates which are to be coated in accordance with the teachings of the present invention are copolymers of ethylene and one or more polar monomers. These substrate copolymers are solid materials under normal conditions, that is at 25° C. They will contain about 20 to 95 weight percent of ethylene and about 5 to 80 weight percent of polar monomer. They include all the copolymer materials which are commonly employed for the fabrication of ethylene-polar monomer copolymer-based molded or shaped articles. Such copolymers include those which have melt indices of about 0 to 100 and densities of about 0.925 to 0.970.

The term "polar monomer" is used in the present specification and claims to denote a substituted $\alpha$-olefin which readily copolymerizes with ethylene and contains a functional group, incorporates a hetero atom, and contributes to a measurable dipole moment. This differentiates from other $\alpha$-olefins such as propylene, butylene, hexene and the like which do not have hetero atoms nor readily measurable dipole moments.

Illustrative of the polar monomers and mixtures thereof which can be copolymerized with ethylene to form the substrate copolymers which can be utilized in accordance with the present invention are the following: vinyl and vinylidene halides such as vinyl chloride, vinylidene chloride, vinylidene bromide and the like; vinyl esters such as vinyl formate, vinyl acetate, vinyl propionate, vinyl butyrate, vinyl 2,4-dimethylpentoate, vinyl pelargonate, vinyl stearate, vinyl pivalate, vinyl tert-butylacetate, vinyl chloroacetate, vinyl chloropropionate, vinyl benzoate, vinyl chlorobenzoate, vinyl diethylacetate, vinyl beta, gamma-dimethyl valerate, vinyl thioacetate, vinyl alcohol and the like; acrylic and alpha-alkyl acrylic acids, their salts, their alkyl esters, their amides and their nitriles such as acrylic acid, chloroacrylic acid, methacrylic acid, ethacrylic acid, methyl acrylate, ethyl acrylate, butyl acrylate, *n*-octyl acrylate, 2-ethylhexyl acrylate, *n*-decyl acrylate, lauryl acrylate, hexadecyl acrylate, octadecyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, methyl vinylacetamide, acrylonitrile, chloroacrylonitrile, methacrylonitrile, ethacrylonitrile, and the like; alkyl esters of maleic and fumaric acid such as dimethyl maleate, diethyl maleate and the like; vinyl alkyl esters and ketones such as vinyl methyl ether vinyl ethyl ether, vinyl isobutyl ether, 2chloroethyl vinyl ether, methyl vinyl ketone, ethyl vinyl ketone isobutyl vinyl ketone and the like; also vinyl pyridine, N-vinyl carbazole, N-vinyl pyrrolidine, ethyl methylene malonate and the like.

Because of the relative ease with which such substrates may be employed in the present invention the preferred copolymers are those of the vinyl esters, particularly vinyl acetate, and the acrylic and alpha-alkyl acrylic acids and the salts and alkyl esters of such acids. The salts of these acids include those formed from cations which are one, two and three valence metals such as sodium, lithium, potassium, calcium magnesium, aluminum, barium, zinc, zirconium, beryllium iron, nickel, cobalt, and the like, and nonmetallic cations such as ammonium ($NH_4^+$).

In addition to ethylene and the polar monomers, the substrate copolymers may also contain minor amounts, i.e., up to about 5 weight percent, of one or more other monomers which are copolymerizable with ethylene and the polar monomers. Such other monomers would include other vinyl compounds, such as other monoolefins, such as propylene, isopropylene, 1-butene, isobutylene, hexene, cyclohexene, and the like; polyolefins such as butadiene, isoprene, dicyclopentadiene, norbornene, and the like; and vinyl aryls such as styrene, o-methylstyrene, p-methyl styrene, m-methylstyrene, p-phenyl styrene, o-phenyl styrene, m-phenyl styrene, vinyl naphthalene and the like.

The term "vinyl" means a compound which contains polymerizable ethylenic unsaturation, i.e.,

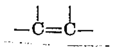

The substrates which are employed in the present invention need not be pretreated with any mechanical or other pretreating procedures prior to the use of the adhesion promoters of the present invention.

The ethylene-polar monomer copolymer substrate may be used in all the various forms in which such substrates have commonly been employed by those in the art, such as in the form of solid, porous or foamed structures. The substrates may also be in any configuration such as film sheet, strip, rod or other molded or shaped configuration.

The substrates may also be in a rigid or plasticized condition. The term "rigid" means that the substrate contains less than about 5 percent by weight, based on the weight of the ethylene-polar monomer copolymer in the substrate, of one or more liquid plasticizers. The term "plasticized" means that the substrate contains more than such amounts of liquid plasticizers.

In addition to plasticizers, the ethylene-polar monomer copolymer substrates may contain other adjuvants which are commonly employed with ethylene-polar monomer copolymers in the fabrication of molded objects. Such other adjuvants would include impact modifiers, fillers, lubricants, stabilizers, coloring agents, processing aids and the like. The amounts of the adjuvants that are employed are those which are effective for the intended purpose. Thus, the effective amount of plasticizer, for example, is a plasticizing amount, that is, an amount of plasticizer which will appreciably increase the flexibility, processability, workability and/or distensibility of the polymer.

Applications for which the ethylene-polar monomer copolymer substrates might be used when coated in accordance with the present invention are the following: functional or decorative items for automobiles such as head restraints, door knobs, arm rests, bezels, trim, and the like; toys; traffic cones; sporting goods, such as decoys and buoys; and furniture coverings.

THE ADHESION PROMOTER

The adhesion promoter which is used in accordance with the present invention is a vinyl acetate polymer. This polymer may be a homopolymer of vinyl acetate or it may be a copolymer of vinyl acetate and one or more other monomers, including ethylene, which may be copolymerizable therewith. Such other monomers would include all those enumerated above with respect to the monomers they may be copolymerized with ethylene to form the substrate copolymers. The preferred adhesion promoter copolymers are those which contain about 2 to 77 weight percent of one or more monomers other than vinyl acetate, and the most preferred of such vinyl acetate copolymers are those which contain about 2 to 77 weight percent of ethylene and about 23 to 98 weight percent of vinyl acetate.

The polymers which are used as the adhesion promoters in the present invention are normally solid at room temperature. They have densities of about 0.94 to 1.0.

Both the copolymer which is used as the substrate and the polymer which is used as the adhesion promoter may be made by techniques commonly known to those in the polymerization art.

The adhesion promoter polymer of the present invention may be used either as a prime coating or paint, or as an additive in a topcoating or paint in accordance with the teachings of the present invention.

The term "coating" or "paint" as used with respect to the present invention means a coating or paint that may be thinned with a solvent that is a solvent for the vinyl acetate polymers that are used as the adhesion promoters. Such solvents would include aromatic hydrocarbons, such as benzene, xylene, toluene and coal tar naphtha; ketones; such as acetone, methyl ethyl ketone and methyl isobutyl ketone; esters, such as isopropyl acetate and n-butyl acetate; ethers, such as dioxane; chlorinated hydrocarbons, such as dichloroethylene and trichloroethylene and others, such as mineral spirits (petroleum distillate, B.P. of about 300°–385° F.).

By the term "solvent" it is meant an organic liquid which will dissolve at least 10 weight percent of the vinyl acetate polymer at 60° C. and will retain at least 10 weight percent of the polymer in solution at room temperature.

USE OF THE ADHESION PROMOTER IN THE TOPCOAT

The vinyl acetate polymer adhesion promoter of the present invention may be added directly to a topcoating which is to be applied directly to the ethylene-polar monomer copolymer substrate. When the vinyl acetate polymer adhesion promoter is used as an additive in a topcoat painting or coating, it should be used in an amount which corresponds to about 10 to 70 percent by weight of the topcoat, based on the nonvolatile component contents of the topcoat.

THE TOPCOATS

The topcoats which may be employed with the vinyl acetate polymer adhesion promoter of the present invention include coatings which are useful for indoor and outdoor applications and for functional and decorative purposes. Such coatings usually contain one or more volatile and/or nonvolatile vehicles, and one or more pigments or extenders. One of more driers may also be used to accelerate the drying of the nonvolatile vehicles. Plasticizers may also be used in the topcoating as flexibilizers or extenders. The amounts of the components of the coatings or paints, other than the adhesion promoter of the present invention, are known to those in the art, and they are dictated by the application.

The volatile vehicles include all those solvents in which the vinyl acetate polymer adhesion promoter is soluble and in which the nonvolatile vehicles may be dissolve or dispersed. The volatile vehicle is usually employed to reduce the viscosity of the nonvolatile vehicles to a more easily handled consistency so as to ease the brushability of the coating and provide the fluidity and stability which are needed for ease of mixing. After the application of the topcoat to the substrate, the volatile vehicles are allowed to evaporate, leaving behind the nonvolatile vehicle to bind the pigment particles to each other and also provide a continuous coating for the substrate.

The nonvolatile vehicles include all those commonly employed in the paint or coating arts which may be dissolved or dispersed in a solvent for vinyl acetate polymer. Such nonvolatile vehicles include resins such as natural and synthetic rubber; drying oils; rosin and rosin derivatives; synthetic resins such as alkyd resins; polyolefins, including polyethylene, chlorinated polyethylene, sulfonated polyethylene, polypropylene and ethylene-propylene copolymers; vinyl resins such as polyvinyl fluoride, polyvinylidene fluoride, polyvinyl chloride, polyvinylidene chloride, polyvinyl acetate, polyvinylacetal, polyvinyl butyral and polyvinyl alcohol; cellulosic resins such as cellulose nitrate and cellulose acetate resins; phenolic resins such as phenolformaldehyde resins; urea and melamine resins; polystyrene; epoxy resins; acrylic resins; silicone resins; polycarbonate resins; polysulfone resins; polyaryl ether resins and the like.

The driers that may be used include salts of various metals. The metals most frequently used to form the drier salts are cobalt, lead, zinc, manganese and calcium. The salts are usually naphthenates, oleates or resinates.

The pigments or extenders that may be used include lead oxide, zinc oxide, anatase and rutile titanium dioxide, antimony oxide, basic carbonate white lead, basic sulfate white lead, basic silicate white lead, leaded zinc oxide, zinc sulfide, lithopone, lead tetraphosphate, zirconium oxide, calcium sulfate, silica, carbon black, red iron oxide, yellow iron oxide, red lead, cadmium sulfide, cadmium lithopones, cadmium sulfoselenides, cuprous oxide, raw and burnt umber, manganite, lead chromates, zinc chromate, zinc tetraoxychromate, chrome greens, chromic oxide, iron blues, cobalt blue, metallic powders of aluminum, copper, bronze, zinc, lead, gold, silver, tin, nickel and stainless steel; and various organic dyes and pigments.

USE OF ADHESIVE PROMOTER AS PRIMER

The vinyl acetate polymer adhesion promoter of the present invention may be used in solution as a primer coating to prime coat the surface of the substrate for the reception of a top coat of another composition. When so used as a primer, the vinyl acetate polymer is preferably dissolved in a solvent therefor so as to provide a solution which will contain at least 10 percent by weight of the vinyl acetate polymer. The primer coating must also contain, in addition to solvent and the vinyl acetate polymer, at least about 10 weight percent, based on the nonvolatile component contents of the primer coating, of the nonvolatile vehicle which is to be employed in the topcoat.

The primer coating may also contain up to about 5 weight percent of one or more nonvolatile plasticizers, based on the nonvolatile component contents of the primer coating. Such plasticizers would include phosphate esters, such as tricresyl phosphate, cresyl diphenyl phosphate, and octyl diphenyl phosphate; phthalate esters, such as dioctyl phthalate, benzyl cyclohexyl phthalate, butylbenzyl phthalate, cresyl benzyl phthalate, di-2 -ethyl hexyl phthalate, butyl phthalyl butyl glycolate and dioctyl phthalate; and epoxy resins, such as butyl epoxy stearate, epoxidized soy bean oil and epoxidized peanut oil.

The primer coating may also include other adjuvants to control or facilitate the application and drying of the primer coating and the topcoating.

The primer coating is usually applied to the substrate so as to provide a layer of primer which is about 0.25 to 1 mil thick after the solvent is removed therefrom.

When the vinyl acetate polymers are used as adhesion promoters in the form of a primer coating, the topcoating which is thereafter applied to the thus primed substrate need not contain any of the vinyl acetate polymer adhesion promoter. The topcoats which may be employed in this regard include all those described above.

Both the primer coating and the topcoating may be applied by any of the commonly employed techniques for applying primers and coatings to substrates such as dip coating, roller coating, knife coating, slush coating and spraying.

In preparing the primer or topcoat compositions, it is preferable that the soluble components of such systems be admixed with the solvent components that are to be employed, at elevated temperatures, in order to dissolved all of such soluble materials therein and then to add the insoluble components to the resulting solutions. The admixture of all the components may be accomplished in a homogenous fashion by any of the commonly employed techniques which are used for this purpose such as ball milling, paint milling, pebble milling and roll mixing. The reduced viscosity values were computed by use of the equation:

$$\text{Reduced viscosity} = t_s - t_o / (c t_o)$$

wherein $t_o$ is the efflux time of the solvent for the polymer, $t_s$ is the efflux time of the solution of the polymer and $c$ is the concentration of the polymer solution in terms of grams of polymer per 100 ml. of solvent.

The following examples are merely illustrative of the present invention and are not intended as a limitation upon the scope thereof.

EXAMPLES A

In these examples various topcoat formulations were employed with an adhesion promoter additive of the present invention. These formulations, that is I–III, are clear formulations, but they could be pigmented or extended with one or more of the pigments or extenders listed above. In preparing the topcoat formulations the vinyl acetate polymer which was employed as the adhesion promoter was dissolved in a portion of the solvent system at an elevated temperature of about 60° C. This solution was then added to a solution of the resin in the remaining solvent and placed in a container and mixed on a can roller for about 10 to 15 minutes. The formulations that were employed were the following:

I. vinyl resin based formulations

| component | weight percent |
|---|---|
| A. vinyl resin[1] | 8.55 |
| ethylene-vinyl acetate copolymer[2] | 3.60 |
| toluene | 70.75 |
| methyl isobutyl ketone (MIBK) | 17.70 |
| | 100.00 |

| component | weight percent |
|---|---|
| B. vinyl resin[1] | 9.0 |
| ethylene-vinyl acetate copolymer[3] | 5.0 |
| toluene | 70.5 |
| MIBK | 15.5 |
| | 100.0 |

II. acrylic resin based formulations

| | weight percent A. | B. |
|---|---|---|
| acrylic resin[4] | 11.7 | 13.3 |
| ethylene-vinyl acetate copolymer[2] | 4.7 | 4.0 |
| toluene | 83.6 | 82.7 |
| | 100.0 | 100.0 |

III. acrylic-nitrocellulose resin based formulation

| | weight percent |
|---|---|
| acrylic resin[4] | 11.80 |
| ½-second nitrocellulose resin solution[5] | 8.55 |
| ethylene-vinyl acetate copolymer[3] | 5.35 |
| n-butyl acetate | 26.00 |
| isopropyl acetate | 9.55 |
| toluene | 26.00 |
| xylene | 12.75 |
| | 100.00 |

[1] vinylchloride-vinylacetate-vinyl alcohol terpolymer which contains such monomers in a 91/36% weight ratio and which has a viscosity of 315 centipoises as a 20% solids content solution in MIBK.

[2] ethylene-vinylacetate copolymer adhesion promoter which contains such monomers in a 72/28% weight ratio and which has a density of 0.95 and a melt index of 350.

[3] ethylene-vinylacetate copolymer adhesion promoter which contains such monomers in a 67/33% weight ratio and which has a density of 0.955 and a melt index of 20.

[4] methylmethacrylate-ethyl acrylate copolymer which contains such monomers in a 75/25% weight ratio and which has a viscosity of 1,000–2,500 centistokes as a 40% solids content solution in toluene.

[5] solution contained, be weight, a) 20% ½-second RS nitrocellulose
b) 24% toluene
c) 56% methyl ethyl ketone These formulations were applied to the following substrates which were in the form of solid sheets about 30 to 130 mils thick:

a. ethylene-vinylacetate copolymer which contained 82 percent by weight of ethylene and 18 percent by weight of vinylacetate and had a density of 0.94 and a melt index of 2.5,
b. ethylene-ethyl acrylate copolymer which contained 82 percent by weigh of ethylene and 18 percent of ethyl acrylate and had a density of 0.931 and a melt index of 6, and
c. ethylene-acrylic acid copolymer which contained 86 percent by weight of ethylene and 14 percent by weight of acrylic acid and had a melt index of 5.

The topcoatings were applied by dip coating or by spraying so as to provide the substrate, after the removal of the solvents in the topcoating, with a layer of topcoat which was of the order of about 0.5 to 1.5 mils thick.

The adhesion of the coatings to the substrates was evaluated by a flexing and a crosshatch test.

In the flexing test the coated substrate was flexed once about 180° under ambient conditions. The flexing did not produce any cracking peeling of the paint from the substrate in all cases where the pain contained the vinyl acetate polymer adhesion promoter of the present invention. Where the adhesion promoter was not used in the paint, however, the paints readily cracked under the flexing test in all cases under the same test conditions.

In the crosshatch test a crosshatched pattern is cut in the surface of the painted sample with a razor blade. A piece of cellophane tape is then placed over the crosshatched pattern and the tape is then removed in an attempt to lift the coating from the surface. In all those instances where the crosshatch test was applied to a paint employing the vinyl acetate polymer adhesion promoter of the present invention, no peeling of the paint occurred. However, where the same base paints were employed without the adhesion promoter of the present invention and the coated substrates were subjected to the crosshatch test, the unmodified paints were readily peeled from the substrates. In all cases the substrates were not treated in any fashion prior to the application of any of the paint formulations thereto.

After the application of the modified or unmodified paints to the substrates, the paints were allowed to dry in air at ambient temperatures of about 25° C. overnight before the commencement of any of the tests indicated above.

EXAMPLES B

This series of example illustrates the use of a vinyl acetate polymer adhesion promoter as an additive in a pigmented topcoating in accordance with the present invention. The topcoat formulation used was the following:

| component | % by weight |
|---|---|
| a) 91/3/6 weight % vinyl chloride-vinyl acetate-vinyl alcohol terpolymer of examples A | 10.0 |
| b) 72/28 weight % ethylene-vinyl acetate copolymer adhesion promoter of examples A | 3.5 |
| c) rutile $TiO_2$ | 1.0 |
| d) ZnO (35% leaded) | 4.1 |
| e) dioctyl phthalate | 1.1 |
| f) toluene | 35.3 |
| g) MIBK | 45.0 |
| | 100.0 |

This topcoat formulation was directly applied to untreated samples of substrates (a) and (b) of examples A by dip coating so as to provide dried coatings having a thickness of about one-half mil. The coatings dry at room temperature overnight. The dried coatings were subjected to the flexing and crosshatch tests described in examples A. The coatings did not crack or peel under such tests, whereas when the same coating is used, but without the inclusion of the vinyl acetate copolymer adhesion promoter, the coatings fail these tests.

EXAMPLES C

This series of examples illustrates the use of a vinyl acetate polymer adhesion promoter in a primer coating, over which a topcoating is applied, in accordance with the present invention.

The primer coating had the following composition:

| component | % by weight |
|---|---|
| a) 91/3/6 weight % vinyl chloride-vinyl acetate-vinyl alcohol terpolymer of examples A | 1.7 |
| b) 72/28 weight % ethylene-vinyl acetate copolymer adhesion promoter of examples A | 6.55 |
| c) toluene | 43.0 |
| d) MIBK | 45.0 |
| e) xylene | 3.75 |
| | 100.00 |

This primer coating was directly applied by spraying so as to provide, after drying, a coating of about ¼-to ½-mil thickness on untreated samples of substrates (a) and (b) of examples A. The primer coatings dried at room temperature in about 3 to 5 minutes.

After the primer coatings had dried a topcoating was directly applied by spraying so as to provide a dried topcoating about 1 mil thick. The topcoating employed had the following composition:

| component | % by weight |
|---|---|
| a) 91/3/6 weight % vinyl chloride-vinyl acetate vinyl alcohol terpolymer of examples A | 13.5 |
| b) dioctyl phthalate | 5.0 |
| c) MIBK | 42.5 |
| d) toluene | 33.5 |
| e) xylene | 5.5 |
| | 100.0 |

The topcoatings were dried at room temperature overnight. The dried topcoatings were subjected to the flexing and crosshatch tests described in examples A. The topcoatings did not crack or peel under such tests, whereas when the same topcoating is used, without a primer coating containing the vinyl acetate polymer adhesion promoter of the present invention, the top coating fails to adhere.

What is claimed is:

1. An ethylene-polar monomer copolymer substrate having a coating adhered thereto, which comprises a. an ethylene-polar monomer copolymer substrate wherein said copolymer comprises 20 to 95 weight percent of ethylene and 5 to 80 weight percent of polar monomer and wherein said polar monomer is a vinyl ester, acrylic acid or alpha-alkyl acrylic acid, or a salt or alkyl ester of such acids, and b. a coating adhered to and superimposed on said substrate, said coating including, as a coating adhesion promoter only, and in an amount corresponding to about 10 to 70 weight percent of said coating, a vinyl acetate polymer, said vinyl acetate polymer being a homopolymer of vinyl acetate or a copolymer which consists of about 2 to 77 weight percent of ethylene and about 23 to 98 weight percent of vinyl acetate, and said coating being one that may be thinned with an organic solvent for said adhesion promoter.

2. A coated substrate as in claim 1 in which the coating is paint.

3. A coated substrate as in claim 1 in which the adhesion promoter is a vinyl acetate homopolymer.

4. A coated substrate as in claim 1 in which said adhesion promoter is a copolymer of vinyl acetate and ethylene.

5. A coated substrate as in claim 4 in which said polar monomer is vinyl acetate.

6. A coated substrate as in claim 4 in which said polar monomer is ethyl acrylate.

7. A coated substrate as in claim 4 in which said polar monomer is acrylic acid.

* * * * *